(12) United States Patent
Huebner et al.

(10) Patent No.: US 10,323,748 B2
(45) Date of Patent: Jun. 18, 2019

(54) CLOSING PLUG

(71) Applicant: ILLINOIS TOOL WORKS INC., Glenview, IL (US)

(72) Inventors: Manuel Huebner, Aub (DE); Jochen Kraus, Sommerach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 158 days.

(21) Appl. No.: 15/315,096

(22) PCT Filed: Mar. 30, 2015

(86) PCT No.: PCT/US2015/023318
§ 371 (c)(1),
(2) Date: Nov. 30, 2016

(87) PCT Pub. No.: WO2015/187239
PCT Pub. Date: Dec. 10, 2015

(65) Prior Publication Data
US 2017/0152948 A1 Jun. 1, 2017

(30) Foreign Application Priority Data
Jun. 6, 2014 (DE) .................. 10 2014 108 068

(51) Int. Cl.
*F16J 13/14* (2006.01)
*B62D 25/24* (2006.01)

(52) U.S. Cl.
CPC .............. *F16J 13/14* (2013.01); *B62D 25/24* (2013.01)

(58) Field of Classification Search
CPC ................................ F16J 13/14; B62D 25/24
(Continued)

(56) References Cited

U.S. PATENT DOCUMENTS 4,363,420 A 12/1982 Andrews
4,490,083 A * 12/1984 Rebish .................. F16B 5/02
411/338
(Continued)

FOREIGN PATENT DOCUMENTS

DE 102009057750 A1 12/2010
WO 2007093862 A1 8/2007
WO 2010121749 A1 10/2010

OTHER PUBLICATIONS

ISR and WO for PCT/US2015/023318 dated Jun. 11, 2015.

*Primary Examiner* — James N Smalley
(74) *Attorney, Agent, or Firm* — Piloff & Passino LLP; Martin J. Cosenza

(57) ABSTRACT

A closing plug for the sealed closure of an opening of a component of a car, wherein the closing plug includes a bottom part and a top part which can be connected to the bottom part, wherein the bottom part has a latching section with a connecting receptacle, which latching section can be inserted into the opening, and the top part has a connecting section which can be inserted into the connecting receptacle, wherein the connecting receptacle and/or the connecting section have/has holding means which hold the connecting section in the connecting receptacle, wherein, furthermore, the top part has a cover section which extends starting from one end of the connecting section, wherein latching means are provided on the latching section of the bottom part, with which latching means the latching section latches at the opening in the state in which it is inserted into the opening.

15 Claims, 3 Drawing Sheets

Figure 1:
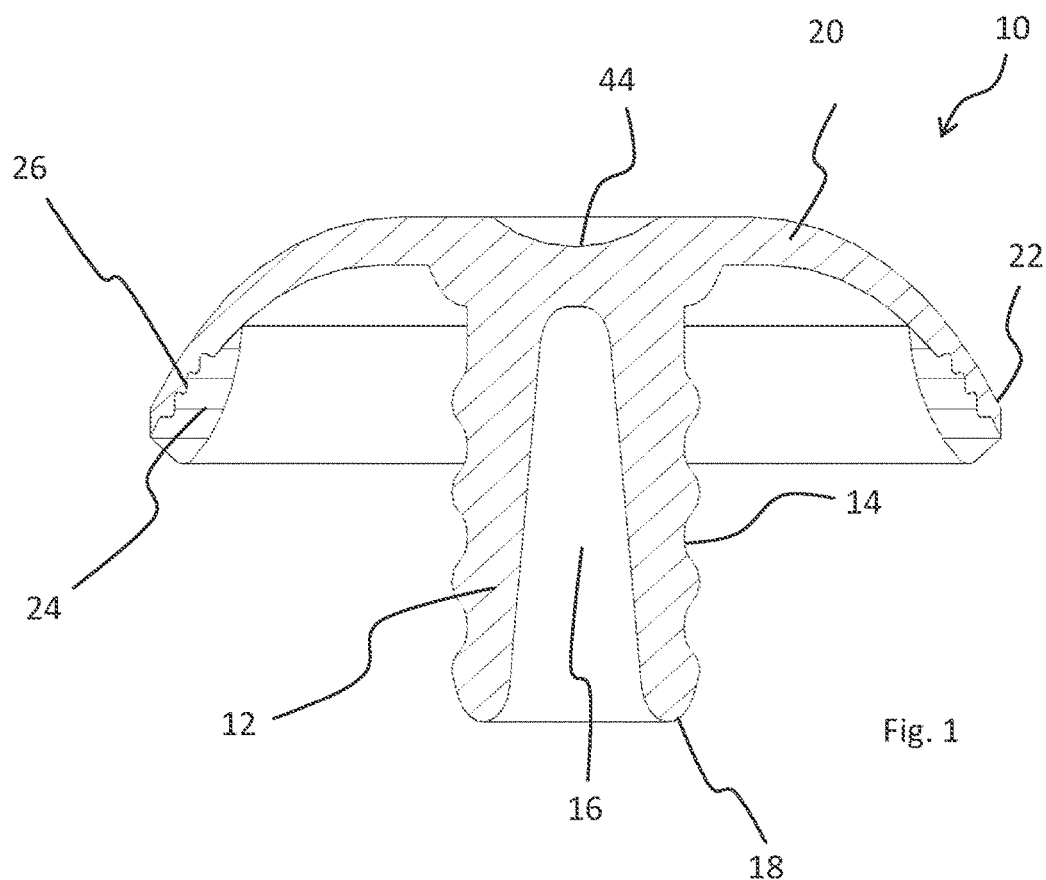

(58) Field of Classification Search
USPC .................. 220/787, 789–791, 359.1–359.4
See application file for complete search history.

(56) References Cited

U.S. PATENT DOCUMENTS

| | | |
|---|---|---|
| 4,998,642 A | 3/1991 | Kraus |
| 2006/0201906 A1* | 9/2006 | Kraus .................... B62D 25/24 |
| | | 215/321 |
| 2009/0078704 A1 | 3/2009 | Janke |
| 2012/0097337 A1 | 4/2012 | Dominguez et al. |

* cited by examiner

CLOSING PLUG

RELATED APPLICATIONS

The present application is a National Phase of International Application Number PCT/US2015/023318, filed Mar. 30, 2015, and claims priority to German Application Number 10 2014 108 068.8, filed Jun. 6, 2014.

The invention relates to a closing plug for the sealed closure of an opening of a component of a car, in particular of an opening in a car body.

Car bodies are frequently painted in immersion baths. Upon removal of the body from the immersion bath, the liquid paint runs off over a plurality of openings formed in the body. These openings then have to be closed in a sealed manner in order to avoid ingress of water or dirt, and associated damage to the body, during operation of the car. To this end, a closing plug is known for example from DE 10 2009 057 750 A1. The closing plug consists of a shank body and, at opposite ends of the shank body, circumferential flanges formed integrally therewith. When inserted into a body opening, the shank body passes partially through the opening, such that one of the flanges bears against a first body side and the other of the flanges bears against the opposite other body side. A circumferential ring made of expanded hot-melt adhesive material is arranged on the flanges in each case on the side that bears against the body. The hot-melt adhesive material melts by heating and sealingly bonds the respective flange to the body.

Closing plugs of this type result in very good sealing of the body openings. However, it has been found that in particular the rim of the body panel, which rim bounds the opening, is particularly susceptible to corrosion. If, for example on account of a leak, water passes into the cavity, damage to the opening rim that is exposed in the cavity can occur in the case of the known closing plug. Furthermore, in terms of tooling, the known closing plug is complicated to produce and high mounting forces can arise. Both of these apply particularly in the case of small opening diameters and resultant small diameters of the closing plug.

Also known are closing plugs which ensure sealing only on one side of the body part. However, these do not always lead to sufficient protection against water ingress during operation, and so damage to the body, in particular to the rim bounding the opening, can occur.

Proceeding from the explained prior art, the invention is based on the object of providing a closing plug of the type mentioned at the beginning, which closing plug provides optimal protection of the component having the opening while being easy to produce and mount and having high holding forces.

The invention achieves the object by way of the subject matter of claim 1. Advantageous configurations can be found in the dependent claims, the description and the figures.

For a closing plug of the type mentioned at the beginning, the invention achieves the object in that the closing plug comprises a bottom part and a top part which can be connected to the bottom part, wherein the bottom part has a latching section with a connecting receptacle, which latching section can be inserted into the opening, and the top part has a connecting section which can be inserted into the connecting receptacle, wherein the connecting receptacle and/or the connecting section have/has holding means which hold the connecting section in the connecting receptacle, wherein, furthermore, the top part has a cover section which extends starting from one end of the connecting section, wherein latching means are provided on the outer side of the latching section of the bottom part, with which latching means the latching section latches at the opening in the state in which it is inserted into the opening, wherein the latching means are covered at least partially by an annularly circumferential hot-melt adhesive material which, after heating, sealingly encloses the opening edge which delimits the opening in the state in which said latching means are latched at the opening.

The closing plug serves for the sealed closure of an opening of a component of a car. The component can be a body part of the car, in particular made of a metal or a plastic. As mentioned at the beginning, a plurality of openings are provided in the body parts, in particular for dip painting or the like. As likewise mentioned at the beginning, the openings have to be closed in a sealed manner for subsequent operation of the car, in order to prevent ingress of for example water and resultant possible damage to the body.

The closing plug according to the invention consists of two separate parts, namely a top part and a bottom part which can be connected in particular detachably together. The latching section of the bottom part can be substantially hollow cylindrical and forms a connecting receptacle for the connecting section of the top part. In a corresponding manner, the connecting section of the top part can be substantially cylindrical or hollow cylindrical. In order to be connected to the bottom part, the top part is inserted with the free end of the connecting section first into the connecting receptacle of the latching section. Holding means hold the top part with its connecting section in the connecting receptacle such that the top part is fixed to the bottom part. The expressions "top part" and "bottom part" or "top" and "bottom" do not of course imply any restriction with regard to the mounting position of the closing plug on the component. It goes without saying that for example in the state in which it is mounted on a car, the top part, in particular its cover section, can be arranged above or below or even to the side of the bottom part.

For example, in the state of the top part and bottom part in which they are connected together, the closing plug is inserted with the free end of the latching section first into the opening of the component. In this case, the latching section latches with its latching means at the opening. As a result, the closing plug is firmly held at the opening. At that end of the connecting section that is opposite the free end of the connecting section of the top part, a cover section is provided. When the closing plug is inserted into the opening, said cover section bears against the component surface directly with an in particular annular bearing face or, as explained further below, via a hot-melt adhesive material. The cover section can have a closed top side which closes the opening in a sealed manner from one side in the state of the closing plug in which it is inserted into the opening.

The latching means are furthermore covered according to the invention partially, in particular over a part of their height, or completely with an annularly closed, circumferential hot-melt adhesive material. The hot-melt adhesive material can in this case be involved in the latching of the latching section at the opening or even fully assume this task. To this extent, the hot-melt adhesive material can thus be part of the latching means. The hot-melt adhesive material melts by heating and bears in the subsequently recooled state against the component, in particular the rim bounding the opening, in a sealing and adhesive manner. It completely encloses in particular the opening rim that is particularly sensitive to corrosion, and so said opening rim is optimally protected. The heating of the hot-melt adhesive material can take place for example during drying of a paint applied to the body in an immersion bath in a drying oven.

The formation of the closing plug according to the invention in two parts allows a high degree of freedom with regard to the plug design. At the same time, the mounting forces during insertion into the opening can be reduced. Moreover, as a result of the two-part configuration of the closing plug, production in terms of tooling is simplified and thus more cost-effective. Thus, the two individual parts of the closing plug can be produced separately in an easy manner, for example in a plastic injection-molding process, and can be removed particularly easily from the injection molds on account of their geometry, in particular drop out of said injection molds by gravity. At the same time, high process stability is achieved and a robust closing plug is produced, which closing plug has high holding forces while having low mounting forces. Even in the event of a slight ingress of liquid, the particularly susceptible component edge that bounds the opening is optimally protected on account of the sealed enclosure by hot-melt adhesive material. The geometry of the hot-melt adhesive material to be applied can also be selected in a flexible manner. The simplification of the production in terms of tooling and the reduced mounting forces on the component are particularly relevant in the case of small diameters of the opening to be closed and associated small diameters of the closing plug, in particular of the latching section. For example, the circular opening or the circular cylindrical or circular hollow cylindrical latching section of the closing plug can have a diameter of less than 30 mm, preferably less than 20 mm.

In order to improve the hold of the closing plug at the opening before heating, provision can be made that, before heating, the hot-melt adhesive material which covers the latching means in an annularly circumferential manner bears against the opening edge which delimits the opening. As already mentioned, the hot-melt adhesive material can latch in particular at the opening rim bounding the opening.

According to a further configuration, provision can be made that a region of the cover section, which region faces the first component surface in the state of the closing plug in which it is inserted into the opening, is likewise covered at least partially by an annularly circumferential hot-melt adhesive material which bears against the first component surface and, upon heating, adhesively bonds the cover section sealingly to the first component surface. As a result, sealing against ingress of liquid is ensured even on the side of the first component surface, which can be for example the side facing the vehicle interior.

Provision can moreover be made that the hot-melt adhesive material which is provided on the latching means and/or the hot-melt adhesive material which is provided on the cover section are/is an expanding hot-melt adhesive material. Provision can also be made that an annularly circumferential cavity is delimited between the first component surface, the latching section and the inner face of the cover section. A further configuration in this regard provides that the hot-melt adhesive material which is provided on the latching means and/or the hot-melt adhesive material which is provided on the cover section compensate/compensates for a pressure change, induced by changing temperature, in the cavity by way of a partial expansion into the cavity. The expanding hot-melt adhesive material which is provided on the latching means and/or the expanding hot-melt adhesive material which is provided on the cover section can have an expansion factor of at least 10%.

According to a further configuration, provision can be made that the connecting section has a thread or groove profile which is formed on its outer side as holding means, and that the connecting receptacle has a thread or groove profile which is formed on its inner side as holding means, wherein, upon insertion of the connecting section into the connecting receptacle, the groove profile or the thread of the connecting section engages into the groove profile or thread of the connecting receptacle. As a result, a particularly secure hold of the closing plug at the opening can be ensured, in particular a releasable hold for disassembly. According to a further configuration, a wall of the connecting section, which wall carries the groove profile or the thread of the connecting section, and/or a wall of the connecting receptacle, which wall carries the groove profile or the thread of the connecting receptacle, can be resiliently elastic. This makes it easier to mount the connecting section in the connecting receptacle. For example, an annularly circumferential slot can be provided adjacent to the wall which carries the groove profile or thread of the connecting receptacle. The connecting section can have for example a central recess. The respective wall can then spring into the slot or into the central recess during mounting.

According to a further configuration, provision can be made that the latching means of the latching section comprise at least one latching projection which is annularly circumferential on the outer side of the latching section and, when the latching section is inserted into the opening, latches on a second component surface which lies opposite the first component surface. The latching projection can be formed in particular in a stepped manner, for example in an L-shaped manner in cross section. The ring of hot-melt adhesive material, too, can be L-shaped in cross section in the non-melted state, in a manner adapted to the geometry of the latching projection, such that the latching section latches with the hot-melt adhesive material at the opening of the component. Again, for easy mounting, a wall of the latching section, which wall carries the annularly circumferential latching projection, can be resiliently elastic. For example, an annularly circumferential slot can be provided adjacent to the wall which carries the latching projection, such that the wall can again spring into the slot. This can be the same slot as the one into which the groove profile or thread of the wall which carries the connecting receptacle can spring.

The cover section can be resiliently elastic at least in the insertion direction of the top part into the bottom part. Moreover, when the closing plug is inserted into the opening, the cover section can bulge, starting from the connecting section, in the direction of the first component surface. Better sealing with respect to the first component surface can be achieved as a result.

The top part and/or the bottom part consist in particular of plastic. Thus, the top part and/or the bottom part can be produced in a plastic injection-molding process, in particular in a two-component injection-molding process. In a two-component injection-molding process, the top part or bottom part is produced from a first plastic in a first injection-molding step and the hot-melt adhesive material, made of a different plastic, is injection-molded onto the cover section of the top part or the latching section of the bottom part in a second injection-molding step. As a result, particularly easy, flexible and cost-effective production is achieved.

The invention also relates to a system comprising a component of a car having an opening, in particular a body component of a car having an opening, and a closing plug according to the invention. The system can be in particular in the state of the top part and bottom part of the closing plug in which they are connected together. Further, the system can be in the state of the closing plug in which it is inserted into the opening. Furthermore, the system can be in the heated and recooled state of the hot-melt adhesive material, in which the opening rim is thus enclosed by the hot-melt adhesive material of the bottom part in a sealingly adhesive manner and optionally the hot-melt adhesive material of the cover section of the top part adheres to the first component surface. Of course, the state in which the closing plug is mounted at the opening but the hot-melt adhesive material has not yet melted is also conceivable.

Figure 2:
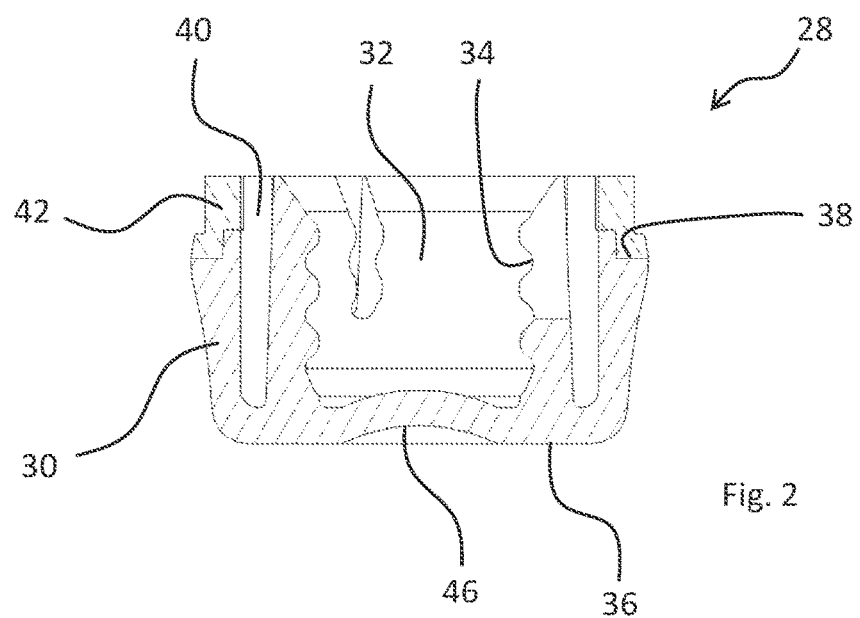
Figure 3:
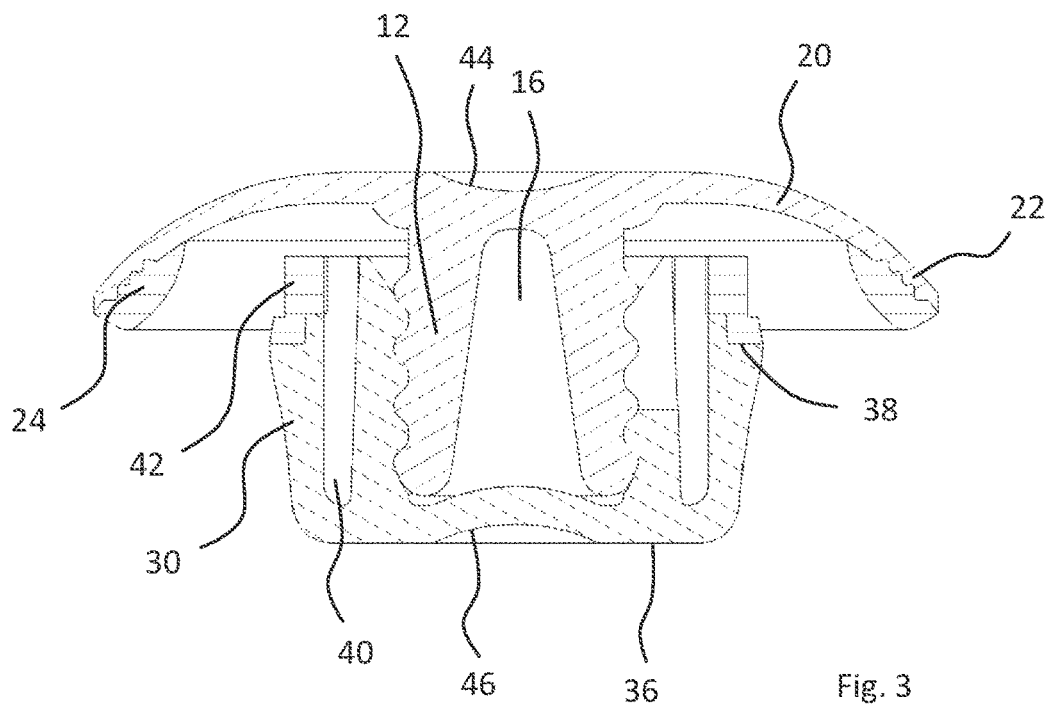
Figure 4:
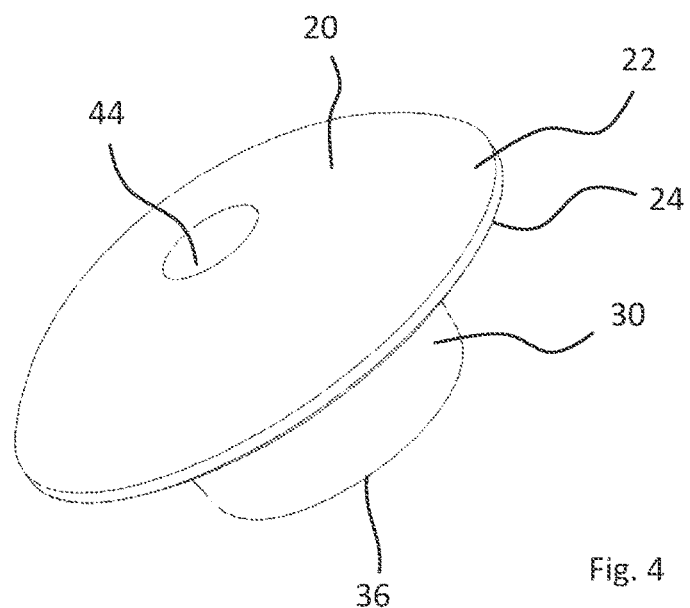
Figure 5:
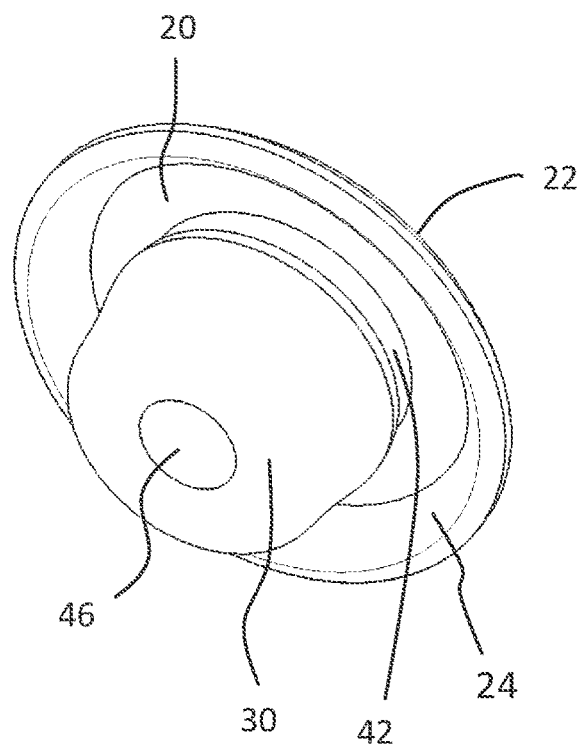
Figure 6:
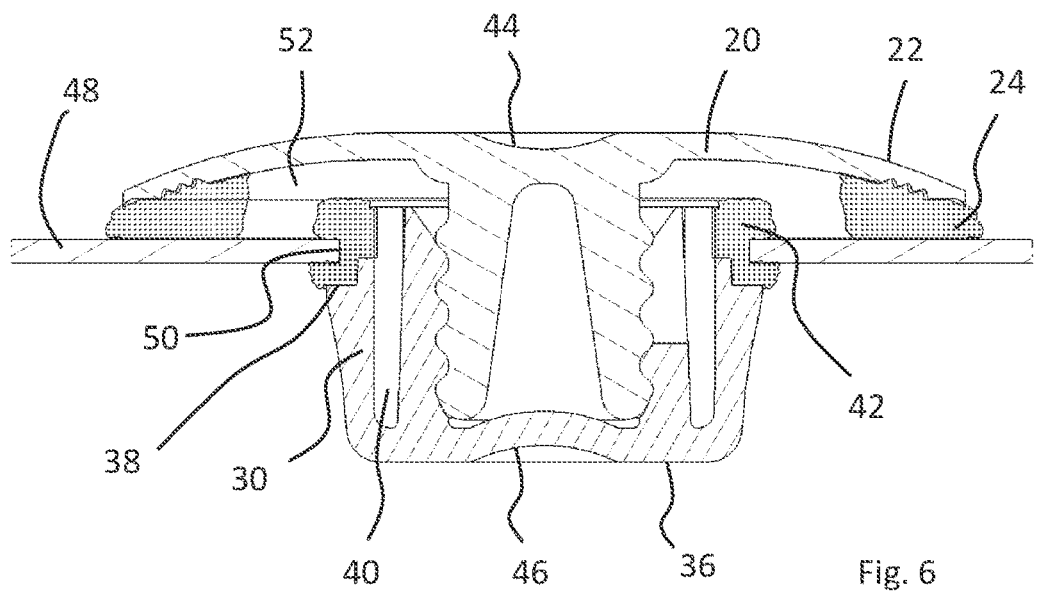

The invention is explained in more detail in the following text with reference to figures, in which, schematically:

FIG. 1 shows a sectional view of a top part of a closing plug according to the invention, FIG. 2 shows a sectional view of a bottom part of a closing plug according to the invention, FIG. 3 shows a sectional view of the top part from FIG. 1 in the state connected to the bottom part from FIG. 2 to form a closing plug according to the invention, FIG. 4 shows a perspective view from above of the closing plug from FIG. 3, FIG. 5 shows a perspective view from below of the closing plug from FIG. 3, and FIG. 6 shows a sectional view of the closing plug from FIG. 3 in the state fully mounted at an opening of a component.

Unless specified otherwise, the same reference signs denote the same items in the figures. The top part 10, shown in FIG. 1, of a closing plug according to the invention has a cylindrical connecting section 12, on the cylindrical outer face of which a plurality of grooves 14 that form a groove profile are formed. The connection section 12 also has a central recess 16 such that the wall of the connecting section 12, which wall carries the groove profile, is resiliently elastic, in particular in the radial direction. The connecting section 12 has a free end 18. Formed at the end opposite the free end 18 is a closed cover section 20 which bulges with its rim 22 in the direction of the free end 18 of the connecting section 12. The inner face, facing the connecting section 12, of the cover section 20 is covered in the region of its rim 22 with an annularly closed circumferential, expanding hot-melt adhesive material 24. In the region in which the hot-melt adhesive material 24 has been applied to the inner face of the cover section 20, the latter has a grooved surface 26 which improves the adhesion of the hot-melt adhesive material 24. The cover section 20 is resiliently elastic, in particular in its region between the connecting section 12 and its rim 22, in particular in the axial direction of the connection section 12. The top part 10 was produced in a two-component injection-molding process in the present case. In a first injection-molding step, the connecting section 12 was molded with the cover section 20 from a first plastic. Subsequently, the hot-melt adhesive material 24, made of a second plastic, was injection-molded onto the cover section 20 in a second injection-molding step.

FIG. 2 shows a bottom part 28 of the closing plug according to the invention. The bottom part has a hollow cylindrical pot-like latching section 30 which forms a cylindrical connecting receptacle 32 in its interior. The inner wall bounding the connecting receptacle 32 likewise has a groove profile formed by grooves 34, which groove profile corresponds to the groove profile of the connecting section 12 of the top part 10. The latching section 30 has a first end 36. An annularly circumferential, step-like latching projection 38 is formed on the outer wall of the latching section 30 at the end opposite the first end 36. In the example shown, an annularly circumferential slot 40 is provided between the outer wall of the latching section 30, which outer wall has the latching projection 38, and the inner wall which carries the groove profile formed by the grooves 34, such that the two above-mentioned walls are resiliently elastic, in particular in the radial direction. In the example shown, the circumferential latching projection 38 is completely covered by a closed circumferential ring of expanding hot-melt adhesive material 42. The ring of hot-melt adhesive material 42 has an approximately L-shaped cross section in the example illustrated. It forms the upper termination of the outer wall of the latching receptacle 30. The bottom part 28, too, was produced in a two-component injection-molding process. In a first injection-molding step, the pot-like latching section 30 was molded together with the wall bounding the connection receptacle from a first plastic. In a second injection-molding step, the ring of hot-melt adhesive material 42, made of a second plastic, was injection-molded onto the latching section 30, in particular the latching projection 38.

FIG. 3 shows the state of the top part 10 shown in FIG. 1 and of the bottom part 28 shown in FIG. 2 in which they are connected together. As is apparent, the top part 10 was inserted with the free end 18 of the connecting section 12 first into the connecting receptacle 32 of the bottom part 28. The grooves 14, 34 of the corresponding groove profiles then come into engagement, as can be readily seen from the cross section in FIG. 3. The resiliently elastic properties of the connecting section 12 and of the wall bounding the connection receptacle 32 make insertion easier. In the state shown in FIG. 3, the top part 10 is held firmly on the bottom part 28. However, by exertion of a correspondingly high traction force, the top part 10 can be detached from the bottom part 28 again by being pulled out.

FIGS. 4 and 5 show two perspective views of the closing plug from FIG. 3. A central indentation 44 on the top side of the cover section 20, which top side faces away from the connecting section 12, and a central indentation 46 in the closed base of the latching section 30 can also be seen.

FIG. 6 shows the closing plug according to the invention which is shown in FIGS. 3 to 5 in a state mounted on a component. The component shown in FIG. 6 with the reference sign 48 is, in the example illustrated, a body part of a car made of (sheet) metal or plastic. An opening rim 50 which is circularly circumferential in the example shown bounds an opening in the body part 48, which opening has been closed in a sealed manner by the closing plug according to the invention.

As is discernible in FIG. 6, the closing plug has been inserted with the free end 36 of the latching section 30 first into the opening. This resulted in latching of the latching projection 38, or of the hot-melt adhesive material 42, at the opening rim 50. The outer wall of the latching section 30, which outer wall carries the latching projection 38, or the hot-melt adhesive material 42, initially yields inwardly in a resiliently elastic manner upon insertion into the opening and subsequently latches in FIG. 6 at the underside of the body part 48. In this state inserted into the opening, the cover section 20 furthermore bears with its ring of hot-melt adhesive material 24 against the top side, in FIG. 6, of the body part 48. A subsequent heating operation, for example in an oven for curing a dip paint applied to the body part 48, resulted in melting and partial expansion of the rings of hot-melt adhesive material 24 and 42, as can be seen in FIG. 6. It can also be seen here that in particular the hot-melt adhesive material 42 completely sealingly encloses the opening rim 50 bounding the opening and in this way adheres to the opening rim 50 and adjoining parts of the top side and underside of the body part 48. The ring of hot-melt adhesive material 24 adheres to the top side of the body part 48.

Bounded between the top side of the body part 48, the latching section 30 having the hot-melt adhesive material 42 and the inner face of the cover section 20 is an annularly circumferential cavity 52 which is closed in a sealed manner by the hot-melt adhesive materials 24, 42. A pressure change, induced by the heating and subsequent cooling, in the cavity 52 is compensated by a partial expansion of the hot-melt adhesive materials 24, 42 into the cavity 52. In the state shown in FIG. 6, the opening bounded by the opening rim 50 is sealed against ingress of liquid into the cavity 52, wherein the particularly sensitive opening rim 50 is optimally protected by the hot-melt adhesive material 42.

The invention claimed is:

1. A closing plug for the sealed closure of an opening of a component of a car, wherein the closing plug comprises a bottom part and a top part which is connectable to the bottom part, wherein the bottom part has a latching section with a connecting receptacle, which latching section is insertable into the opening, and the top part has a connecting section which is insertable into the connecting receptacle, wherein the connecting receptacle and/or the connecting section have/has holding means which hold the connecting section in the connecting receptacle, wherein, furthermore, the top part has a cover section which extends starting from one end of the connecting section, wherein latching means are provided on the outer side of the latching section of the bottom part, with which latching means the latching section latches at the opening in the state in which it is inserted into the opening, wherein the latching means are covered at least partially by an annularly circumferential hot-melt adhesive material which, after heating, sealingly encloses the opening edge which delimits the opening in the state in which said latching means are latched at the opening.

2. The closing plug as claimed in claim 1, wherein, before heating, the hot-melt adhesive material which covers the latching means in an annularly circumferential manner bears against the opening edge which delimits the opening.

3. The closing plug as claimed in claim 1, wherein a region of the cover section, which region faces a first component surface in the state of the closing plug in which it is inserted into the opening, is likewise covered at least partially by an annularly circumferential hot-melt adhesive material which bears against the first component surface and, upon heating, adhesively bonds the cover section sealingly to the first component surface.

4. The closing plug as claimed in claim 1, wherein the hot-melt adhesive material which is provided on the latching means and/or the hot-melt adhesive material which is provided on the cover section are/is an expanding hot-melt adhesive material.

5. The closing plug as claimed in claim 3, wherein an annularly circumferential cavity is delimited between the first component surface, the latching section and the inner face of the cover section.

6. The closing plug as claimed in claim 4, wherein the hot-melt adhesive material which is provided on the latching means and/or the hot-melt adhesive material which is provided on the cover section compensate/compensates for a pressure change, induced by changing temperature, in the cavity by way of a partial expansion into the cavity.

7. The closing plug as claimed in claim 4, wherein the expanding hot-melt adhesive material which is provided on the latching means and/or the expanding hot-melt adhesive material which is provided on the cover section have/has an expansion factor of at least 10%.

8. The closing plug as claimed in claim 1, wherein the connecting section has a thread or groove profile which is formed on its outer side as holding means, and in that the connecting receptacle has a thread or groove profile which is formed on its inner side as holding means, wherein, upon insertion of the connecting section into the connecting receptacle, the groove profile or the thread of the connecting section engages into the groove profile or thread of the connecting receptacle.

9. The closing plug as claimed in claim 8, wherein a wall of the connecting section, which wall carries the groove profile or the thread of the connecting section, and/or a wall of the connecting receptacle, which wall carries the groove profile or the thread of the connecting receptacle, are/is resiliently elastic.

10. The closing plug as claimed in claim 1, wherein the latching means of the latching section comprise at least one latching projection which is annularly circumferential on the outer side of the latching section and, when the latching section is inserted into the opening, latches on a second component surface which lies opposite a first component surface.

11. The closing plug as claimed in claim 10, wherein a wall of the latching section, which wall carries the annularly circumferential latching projection, is resiliently elastic.

12. The closing plug as claimed in claim 1, wherein the cover section is resiliently elastic as the top part is configured to be inserted into the bottom part.

13. The closing plug as claimed in claim 1, wherein, when the closing plug is inserted into the opening, the cover section bulges, starting from the connecting section, in the direction of a first component surface.

14. The closing plug as claimed in claim 1, wherein the top part and/or the bottom part are/is produced in a plastic injection-molding process, in particular in a two-component plastic injection-molding process, in which the hot-melt adhesive material has been sprayed onto the latching section and/or onto the cover section.

15. A system comprising a component of a vehicle, in particular of a car, having an opening and a closing plug as claimed in claim 1.

* * * * *